3,495,989
QUICK COOKING FOODSTUFFS
David Adrian Lewis, 14 Saunders Bay Road, Caringbah, near Sydney; Victor Marcus Lewis, 6 Bogata St., Neutral Bay, near Sydney; and John Moseley Lewis, 17 Norfolk St., Killara, near Sydney, all of New South Wales, Australia
No Drawing. Continuation-in-part of application Ser. No. 306,590, Sept. 4, 1963. This application Oct. 22, 1965, Ser. No. 502,541
Claims priority, application Australia, Sept. 5, 1962, 21,812
Int. Cl. A23l 1/10
U.S. Cl. 99—80       11 Claims

ABSTRACT OF THE DISCLOSURE

A quick-cooking foodstuff selected from the group consisting of seeds and alimentary pastes having at least 50 percent starch is prepared by steeping the foodstuff in an aqueous sodium chloride solution at 32° to 170° F. for a period of approximately 5 minutes to 72 hours until 3 to 30 weight percent of the increased weight is sodium chloride.

---

This application is a continuation-in-part of our application Ser. No. 306,590 filed Sept. 4, 1963, now abandoned, and relates to quick cooking foodstuffs prepared from seeds and alimentary paste products which seeds and alimentary paste products have a starch content in excess of 50%. The expression seeds is used in this specification to include cereal grains such as rice, wheat, barley as well as other edible seeds such as certain types of legumes for example, peas, beans and lentils.

The invention has been devised to provide a quick cooking foodstuff of the type described which when prepared according to the invention retains most of the essential food elements of which it is comprised, which will remain stable, that is in its prepared condition, for indefinite periods even under adverse climatic conditions, and which is resistant to attack by vermin, weevils, larvae and the like.

Rice grains, for example in a natural dry state have a moisture content of approximately 8% to 14%. By cooking, the starch and other constituents are hydrated and the starch is gelatinised and when in an edible state has a moisture content of about 65% to 80% or higher. This increase in moisture content is usually achieved by boiling the grains for relatively long periods and in the case of certain types of grains it is sometimes necessary to subject the grain to preliminary hydration in order to make the starch and other constituents capable of being readily cooked.

In an attempt to shorten the final (consumers) cooking time of rice it has been proposed hitherto to subject the foodstuff to partial precooking and substantial dehydration before it is packed for sale. Rice prepared in this manner is known as quick cooking rice.

According to the present invention foodstuffs of the type described are prepared for sale as quick cooking foodstuffs by first impregnating seeds or alimentary paste products having a starch content in excess of 50% with a solution of water and sodium chloride until a uniform penetration of the solution through the foodstuff is achieved. The impregnation is achieved by steeping and any surface moisture remaining on the foodstuff after removal from the steep solution may be subsequently removed. For certain foodstuffs of the type described the foodstuff is removed from the solution prior to a uniform penetration and in such case the foodstuff is held in a condition which will permit a uniform penetration of the already contained saline solution. The foodstuff is then in a saleable condition as a quick cooking foodstuff and it will remain substantially stable for indefinite periods.

The degree of penetration of the saline solution larger tempering period is required. Alternatively a test that is by cutting through one of the impregnated seeds and if a visual inspection reveals that the centre portion of the seed is hard and flinty then the degree of penetration of the saline solution is insufficient and a larger tempering period is required. Alternately a test sample of the impregnated foodstuff can be cooked and if after normal reduced cooking time for the selected sample as set out in the examples the centre portion of the foodstuff is uncooked a larger tempering period is required.

It will be appreciated that tests just described will reveal a range of time periods which are necessary to permit the uniform penetration of the saline solution, and once these periods have been determined it will be unnecessary to repeat the tests for every type of foodstuff treated in accordance with the invention.

The absorption of saline solution varies considerably with the type of foodstuff treated. For rice, for example, the maximum absorption depending on the type of rice, is between 25% and 100% of the weight of the rice at room temperature. For spaghetti and other alimentary pastes the maximum absorption is approximately 80% of the weight of the paste.

The period of soak may be conveniently shortened by raising the temperature of the saline solution. Although it is not essential to the performance of the invention it is preferred to soak the foodstuff in a saturated or near saturated saline solution. Preferably the steeping is carried out in the solution at a temperature within the range of 32° to 170° F. for a period of approximately 5 minutes to 72 hours.

Salt introduced into a foodstuff as aforesaid increases the rate of absorption of water and consequently the rate of gelatinisation of the constituent starch during subsequent cooking processes. Consequently the cooking time is substantially reduced and the foodstuff is more evenly cooked than was possible hitherto. Additives such as preservatives, flavourings, colourings, minerals, vitamins and the like may be added to the foodstuff per medium of the saline solution if desired.

Certain micro-organisms such as Sporendonema spp., Penicillium spp., Micrococcus spp., Aspergillus spp., may be encountered which are capable of very slow growth on foodstuffs which have been treated according to the invention. Most of these organisms do not grow at reduced (refrigerator) temperatures, nor at sustained temperatures of about 100° F. or above. They are mainly subject to inactivation by heat at very moderate pasteurisation temperatures for short times. When such salt resistant organisms are likely to be encountred, it is desirable to carry out one or more of the following operations, namely:

(a) Add an additional preservative such as sulphur dioxide, sorbic acid or its derivatives, benzoic acid or its derivatives where this is permitted by law.

(b) Hold the foodstuffs in cold storage.

(c) Hold the foodstuff in warm storage.

(d) Gelatinise the foodstuff and reduce its moisture content sufficiently, for example from 5% to 15% of the weight of the impregnated foodstuff so that it becomes unsuitable as a growth medium for micro-organisms.

(e) Pack and hold the foodstuff in a vacuum.

(f) Pasteurise the foodstuff.

(I) When the foodstuff is to be packed into units for sale, the treated foodstuff may be packed into a bag or container which is not subject to damage by heat container then subjected to a conventional form of heating for the purpose of pasteurising the foodstuff. During pasteurisation the starch in the foodstuff will become gelatinised to some extent. This does not hinder the subsequent cooking and eating qualities of the foodstuff and in the case of most foodstuffs, the individual seeds or particles of foodstuffs when gelatinised are less brittle and are more resistant to impact than if they are not gelatinised.

(II) When the foodstuff is to be packed in bulk containers where heat penetration during pasteurisation could be incomplete the foodstuff may be pasteurised prior to packing and then partly dehydrated, for example between 5% to 95% of the moisture remaining in said foodstuff. The foodstuff may then be handled in bulk in a normal manner as long as packaging is such as to prevent further substantial loss of moisture.

Depending on atmospheric conditions the treated foodstuff, if left exposed to the air, will continue to lose weight as moisture, until a fairly stable final weight is reached. Foodstuffs "dried" in this manner have excellent keeping and handling qualities and are still a quick cooking foodstuff. Foodstuffs so treated will not be subject to microbial spoilage so long as excessive moisture absorption after preparing as aforesaid is prevented.

(III) It is entirely practicable and feasible to pack the gelatinised foodstuff whilst hot into a container which is then sealed immediately. Such a container or package should be substantially moisture-proof and in this regard bags made from polyethylene coated or polyvinylidene chloride coated films or papers are satisfactory.

(IV) It is also satisfactory to pack the steeped and gelatinised or ungelatinised foodstuff in a container under vacuum.

Foodstuffs treated in the manner described herein are prepared for consumption by boiling in a quantity of water which is sufficient to absorb the contained salt. For most purposes it has been found that a volume of water 6 to 8 times the weight of the foodstuff produces a palatable product.

The invention will now be described with the accompanying examples.

RICE 1000 grams of dried polished rice having a moisture content as marketed of 12–14 percent, was soaked in a saturated saline solution, the volume of the solution being such that the grains are fully covered and there is enough solution over the immersed grains so that they did not rise above the surface of the solution as they expand during absorption of the solution.

The rice grains and solution during the steeping phase may be held at normal ambient temperatures for example, 50–90° F. or may be at slightly elevated temperatures such as 90–130° F.

Steeping was allowed to proceed until little or no further uptake of the saline solution occurred. In practice it was found that steeping is substantially completed in about three to five hours at room temperatures or slightly less at elevated temperatures.

The remaining solution was then drained from the soaked rice and it was found that the weight of the rice mass increased from about 1000 grams to 1350 to 1450 grams depending on the degrees of completeness of the uptake of the solution and also on the particular type of rice used.

The soaked rice was then passed over a de-watering screen or any similar apparatus which will render the surface of the individual grains damp dry. This de-watering is not mandatory for the performance of the invention and is merely to permit the easy handling of the product.

In commercial practice it may be desirable to subsequently dehydrate the damp-dry rice by passing the grains in a thin layer on a conveyor under radiant heat or across a perforated moving belt through which hot air is blown. Trough-belt driers or fluidised bed driers may also be used for this purpose. During this step the grains should be rapidly heated up to 170–200° F. This also causes the starch granules within the individual grains to be gelatinised and take on a translucent appearance resembling normal dry rice. The weight lost during this step should be kept within the range of about 5 to 15 percent of the weight of the damp-dry rice.

Gelatinisation improves the firmness and appearance of the grains and renders them less subject to impact injury during subsequent handling and marketing operations. The heating also causes pasteurisation of the grains which further enhances the keeping quality of the product.

Rice grains which have been treated according to this example with or without the supplementary gelatinisation, pasteurisation and partial dehydration may be cooked as follows:

One volumetric measure of treated rice was placed in about five or more volumetric measures of water. If the rice is placed in boiling water, it is necessary to simmer it for approximately 4 to 6 minutes. If the rice is placed in cold water which is then brought to the boil, the simmering time will be slightly less. After allowing to simmer for approximately 4 to 6 minutes or less, the rice was strained from the water and is ready for eating.

By comparison, ordinary dry rice (untreated according to the invention) takes 15 to 20 minutes to cook. When removed from the water, it will be relatively overcooked, and sticky on the outside of the grains and its rate of deterioration in table quality on being held warm awaiting serving will be much more rapid.

Rice treated in accordance with the invention apart from cooking in about ⅓ of the normal time, will be found to be less sticky, more palatable and it can be held warm for much longer periods awaiting serving without deterioration.

BARLEY

The barley treated in this example consists of whole barley grains from which a portion of the outer bran layer was removed by abrasion. Barley so treated is called "pearled barley."

One hundred grams of commercial dry pearled barley was immersed in a saturated saline solution. As in the case of Example 1, the volume of solution was such that the grains were fully covered and so did not rise above the surface of the solution as they expanded during absorption of the solution. The temperature of the solution during the steeping phase was maintained at 78° F. After steeping for 105 minutes, the barley grains were removed from the solution and drained. The weight of the barley was found to have increased to 144 grams as a result of the uptake of the saline solution.

A tempering period was required to permit the saline solution which had been absorbed by each grain during the steeping phase to be uniformly distributed throughout the grain. This tempering period may conveniently be carried out over a period of approximately 12 hours or the steeped barley may simply be packaged and the tempering process allowed to proceed within the package.

The treated barley may be then subjected to gelatinisation, pasteurisation and partial dehydration as set out in Example 1, that is to say, it may be passed through a blast of hot air so arranged that the grains are rapidly heated to approximately 180° F. The weight lost during this partial dehydration step should be kept within the range of about 10 percent of the damp dry weight of the barley grains.

Barley grains which have been treated according to this example with or without supplemental gelatinising, pasteurising and partial dehydration processes may be cooked as follows:

One volumetric measure of treated barley grains is placed in about 6 volumes of boiling water. Simmering is continued for approximately 12 minutes. If the barley grains are placed in cold water which is then brought to the boil, the simmering time will be slightly less.

The barley is strained from the cooking water and is ready for eating.

By comparison, ordinary dry pearled barley untreated according to this invention, takes 35 minutes to cook. It will be relatively over-cooked, sticky on the outside of the grains, and less easy to handle. Its rate of deterioration of table quality on holding warm will be much greater than barley treated in accordance with the invention.

Barley treated in accordance with the invention apart from cooking in about ⅓ of the normal time, will be less sticky, and can be held warm for much longer periods of time without loss of table quality.

PEARLED WHEAT

Wheat grains which were pearled in a "Waring Blendor" by spinning the blender at slow speeds until a large number of scratches was effected through the bran of each grain.

One hundred grams of pearled wheat prepared as above were immersed in a saturated saline solution. As in the case of Example 1, the volume of solution was such that the grains were fully covered and so did not rise above the surface of the solution, as they expanded during take up of the solution. The temperature of the solution during the steeping phase was maintained at 78° F. After steeping for 165 minutes, the wheat grains were removed from the solution and drained. The weight of the wheat was found to have increased to 144 grams as a result of the uptake of the saline solution.

A tempering period was required to permit the saline solution which had been absorbed by each grain during the steeping phase to be uniformly distributed throughout the grain. This tempering period may conveniently be carried out over a period of approximately 12 hours or the steeped wheat may simply be packaged and the tempering process allowed to proceed within the package.

The wheat may be then subjected to gelatinisation, pasteurisation and partial dehydration as set out in Example 1, that is to say, it may be passed through a blast of hot air so arranged that the grains are rapidly heated to approximately 180° F. The weight lost during this dehydration step should be kept within the range of about 10 percent of the damp dry weight of the wheat grains.

Wheat grains which have been treated according to this example with or without supplemental pasteurising, gelatinising and partial dehydrating processes may be cooked as follows:

One volumetric measure of treated wheat grains is placed in about 6 volumes of boiling water. Simmering is continued for approximately 10 minutes. If the wheat grains are placed in cold water which is then brought to the boil, the simmering time will be slightly less.

At the end of the simmering period the wheat is strained from the cooking water and is ready for eating.

By comparison, ordinary dried wheat untreated according to the invention, takes 60–80 minutes of boiling to produce an edible foodstuff.

PEELED WHEAT

The wheat treated in this example was peeled following known procedures (see Food Technology 18:(8):40, 1964) according to which pretreated wheat grains are treated with an alkali, rinsed, neutralised and dried.

One hundred grams of dried peeled wheat was immersed in an equal weight of saturated saline solution. As in the case of Example 1, the volume of solution was such that the grains were fully covered and so did not rise above the surface of the solution, as they expanded during take up of the solution. The temperature of the solution during the steeping phase was maintained at 78° F. After steeping for twenty hours, the wheat grains were removed from the solution and drained. The weight of the wheat was found to have increased to 140 grams as a result of the uptake of the saline solution.

A tempering period was required to permit the saline solution which had been absorbed by each grain during the steeping phase to be uniformly distributed throughout the grain. This tempering period may conveniently be carried out over a period of approximately 12 hours or the steeped wheat may simply be packaged and the tempering process allowed to proceed within the package.

The treated wheat may be then subjected to gelatinisation, pasteurisation and partial dehydration as set out in Example 1, that is to say, it may be passed through a blast of hot air so arranged that the grains are rapidly heated to approximately 180° F. The weight lost during this dehydration step should be kept within the range of about 10 percent of the damp dry weight of the wheat grains.

Wheat grains which have been treated according to this example with or without a supplemental gelatinising, pasteurisation and dehydration processes may be cooked as follows:

One volumetric measure of treated wheat grains is placed in about 6 volumes of boiling water. Simmering is continued for approximately 5 minutes. If the wheat grains are placed in cold water which is then brought to the boil, the simmering time will be slightly less.

At the end of the simmering period the wheat is strained from the cooking water and is ready for eating.

By comparison, ordinary dried peeled wheat untreated according to the invention, takes 25 minutes of boiling to produce an edible foodstuff.

YELLOW SPLIT PEAS

The yellow split peas treated in this example consist of whole peas from which all of the outer seed coat layer was removed by milling.

One hundred grams of such peas were immersed in saturated saline solution. As in the case of Example 1, the volume of solution was such the peas were fully covered and so did not rise above the surface of the solution, as they expanded during take up of the solution. The temperature of the solution during the steeping phase was maintained at 78° F. After steeping for 170 minutes the peas were removed from the solution and drained. The weight of the peas was found to have increased to 140.7 grams as a result of the uptake of the saline solution.

A tempering period was required to permit the saline solution which has been absorbed by each seed during the steeping phase to be uniformly distributed throughout the seed. This tempering period may conveniently be carried out over a period of approximately 12 hours or the steeped peas may simply be packaged and the tempering process allowed to proceed within the package.

The treated peas may be then subjected to gelatinisation, pasteurisation and dehydration as set out in Example 1, that is to say, it may be passed through a blast of hot air so arranged that the peas are rapidly heated to approximately 180° F. The weight lost during this dehydration step should be kept within the range of about 10 percent of the damp dry weight of the peas.

Peas which have been treated according to this example with or without supplemental gelatinisation, pasteurising and dehydration processes may be cooked as follows:

One volumetric measure of treated peas is placed in about 6 volumes of boiling water. Simmering is continued for approximately 2 to 3 minutes. If the peas are placed in cold water which is then brought to the boil, the simmering time will be slightly less.

At the end of the simmering period the peas are strained from the cooking water and are ready for eating.

By comparison, ordinary yellow split peas untreated according to the invention, take 7 to 8 minutes of boiling to produce an edible foodstuff.

DRIED GREEN PEAS

The dried green peas treated in this example consist of whole dried green peas from which a portion of the outer seed coat layer was removed by abrasion.

One hundred grams of commercial dried green peas treated as above were immersed in saturated saline solution. As in the case of Example 1, the volume of solution was such that the peas were fully covered and so did not rise above the surface of the solution, as they expanded during take up of the solution. The temperature of the solution during the steeping phase was maintained at 78° F. After steeping for 78 minutes, the peas were removed from the solution and drained. The weight of the peas was found to have increased to 147.3 grams as a result of the uptake of the saline solution.

A tempering period was required to permit the saline solution which has been absorbed by each grain during the steeping phase to be uniformly distributed throughout the peas. This tempering period may conveniently be carried out over a period of approximately 12 hours or the steeped peas may simply be packaged and the tempering process allowed to proceed within the package.

The treated peas may be then subject to gelatinisation, pasteurisation and dehydration as set out in Example 1, that is to say, they may be passed through a blast of hot air so arranged that the peas are rapidly heated to approximately 180° F. The weight lost during this dehydration step should be kept within the range of about 10 percent of the damp dry weight of the peas.

Peas which have been treated according to this example with or without supplemental gelatinisation, pasteurising and dehydration processes may be cooked as follows:

One volumetric measure of treated peas is placed in about 6 volumes of boiling water. Simmering is continued for approximately 17 minutes. If the peas are placed in cold water which is then brought to the boil, the simmering time will be slightly less.

At the end of the simmering period the peas are strained from the cooking water and are ready for eating.

By comparison, ordinary dried green peas untreated according to the invention, take 47 minutes of boiling to produce an edible foodstuff.

ALIMENTARY PASTES

This experiment was conducted with "Risoni" type of alimentary paste which comprises small pieces of dried alimentary paste cut to such size that they look like rice grains.

One hundred grams of Risoni was immersed in a saturated saline solution. As in Example 1, the volume of solution was such that the product was fully covered and did not rise above the surface of the solution, as it expanded during take up of the solution. The temperature of the solution during the steeping phase was maintained at 78° F. After steeping for 105 minutes, the product was removed from the solution and drained. The weight of the product was found to have increased to 143.8 grams as a result of the uptake of the saline solution.

A tempering period was required to permit the saline solution which has been absorbed by the product during the steeping phase to be uniformly distributed throughout each particle. This tempering period may conveniently be carried out overnight.

The treated product may be then subjected to gelatinisation and pasteurisation by heating it in a closed container to a temperature of about 190° F.

Risoni which has been treated according to this example with or without a supplemental pasteurising and gelatinising processes may be cooked as follows:

One volumetric measure of treated Risoni is placed in about 6 volumes of boiling water. Simmering is continued for approximately 4 to 5 minutes. If the Risoni is placed in cold water which is then brought to the boil, the simmering time will be slightly less.

At the end of the simmering period the Risoni is strained from the cooking water and is ready for eating.

By comparison, ordinary Risoni untreated according to the invention, takes 16 to 17 minutes of boiling to produce an edible foodstuff.

ALIMENTARY PASTES

This experiment was conducted with a solid spaghetti type of alimentary paste.

One hundred grams of commercial solid type spaghetti was immersed in an equal weight of saturated saline solution. As in the case of Example 1, the volume of solution was such that the spaghetti was fully covered and so did not rise above the surface of the solution, as it expanded during take up of the solution. The temperature of the solution during the steeping phase was maintained at 78° F. After steeping for 187 minutes, the spaghetti was removed from the solution and drained. The weight of the spaghetti was found to have increased to 141.2 grams as a result of the uptake of the saline solution.

A tempering period was required to permit the saline solution which has been absorbed by each grain during the steeping phase to be uniformly distributed throughout the product. This tempering period may conveniently be carried out overnight.

The treated spaghetti may be then subjected to gelatinisation and pasteurisation by heating in a closed container to a temperature of about 190° F.

Spaghetti which has been reacted according to this example with or without the supplemental pasteurising and gelatinising processes may be cooked as follows:

One volumetric measure of treated spaghetti is placed in about 6 volumes of boiling water. Simmering is continued for approximately 4 minutes. If the spuaghetti is placed in cold water which is then brought to the boil, the simmering time will be slightly less.

At the end of the simmering period the spaghetti is strained from the cooking water and is ready for eating.

By comparison, ordinary spaghetti untreated according to the invention, takes 17 minutes of boiling to produce an edible foodstuff.

It is also within the scope of this invention to cook the foodstuff after it has been steeped in the saline solution. The partially cooked foodstuff is then dehydrated to remove the bulk of the moisture content. This results in a substantially dry product which may then be packed in a conventional manner.

We claim:

1. The method of preparing quick cooking foodstuffs said foodstuffs being selected from the group consisting of cereal grains, legumes and alimentary pastes having a starch content in excess of 50%, said method comprising steeping said foodstuff in an aqueous solution of sodium chloride at a temperature within the range of 32° to 170° F. for a period of approximately 5 minutes to 72 hours until a uniform penetration of said saline solution throughout said foodstuff is achieved, subsequently removing the foodstuff from said solution and removing the surface moisture from the foodstuff, the uptake of saline solution by said foodstuff being between 25% and 100% of the weight of the unsteeped foodstuff of which 3% to 30% of the total increase in weight is sodium chloride.

2. The method of preparing quick cooking foodstuffs as claimed in claim 1 wherein the aqueous saline solution is a substantially saturated solution.

3. The method of claim 1 further comprising rapidly heating the steeped foodstuff to a temperature between 100° F. and 170° F. to remove the surface moisture and effect pasteurisation thereof.

4. The method of claim 1 further comprising cooking said foodstuff and dehydrating the partially cooked foodstuff to remove the bulk of the moisture content thereof.

5. The method of claim 1 further comprising rapidly heating the steeped foodstuff to a temperature between 170° to 200° F. to remove the surface moisture therefrom and effect pasteurisation and at least partial gelatinisation thereof.

6. The method as claimed in claim 5 wherein said foodstuff is subsequently dehydrated to remove 5% to 95% of the moisture remaining in said foodstuff after pasteurisation.

7. The method of preparing quick cooking foodstuffs of the type comprising seeds and alimentary pastes said foodstuff having a starch content in excess of 50%, said method comprising steeping said foodstuff in an aqueous solution of sodium chloride at a temperature within the range of 32° to 170° F. for a period of approximately 5 minutes to 72 hours until the uptake of saline solution by said foodstuff is between 25% and 100% of the weight of the unsteeped foodstuff of which 3% to 30% of the total increase in weight is sodium chloride, removing said foodstuff from said solution and tempering said foodstuff to obtain uniform distribution of the solution therein.

8. The method of claim 7 further comprising rapidly heating the foodstuff to a temperature between 170° to 200° F. to effect pasteurisation and at least partial gelatinisation thereof.

9. The method as claimed in claim 8 wherein said foodstuff is subsequently dehydrated to remove 5% to 95% of the moisture remaining in said foodstuff after pasteurisation.

10. The method of claim 7 further comprising cooking said foodstuff and dehydrating the partially cooked foodstuff to remove the bulk of the moisture content thereof.

11. A quick-cooking foodstuff prepared according to the process of claim 1.

References Cited

UNITED STATES PATENTS

| | | | |
|---|---|---|---|
| 2,438,939 | 4/1948 | Ozai-Durrani | 99—80 |
| 3,052,556 | 9/1962 | Baile | 99—186 |
| 3,083,102 | 3/1963 | Carcassonne-Leduc | 99—80 |
| 3,281,248 | 10/1966 | Fioravanti et al. | 99—85 |

RAYMOND N. JONES, Primary Examiner

U.S. Cl. X.R.

99—85, 98